United States Patent
Baxter

(10) Patent No.: US 9,678,242 B2
(45) Date of Patent: Jun. 13, 2017

(54) MANUAL RFID ANTENNA TUNING SYSTEM AND METHOD

(71) Applicant: Cameron International Corporation, Houston, TX (US)

(72) Inventor: Daniel Brent Baxter, Tomball, TX (US)

(73) Assignee: Cameron International Corporation, Houston, TX (US)

(*) Notice: Subject to any disclaimer, the term of this patent is extended or adjusted under 35 U.S.C. 154(b) by 363 days.

(21) Appl. No.: 13/921,574

(22) Filed: Jun. 19, 2013

(65) Prior Publication Data
US 2013/0278433 A1    Oct. 24, 2013

Related U.S. Application Data

(63) Continuation of application No. 13/387,609, filed as application No. PCT/US2010/044173 on Aug. 2, 2010, now Pat. No. 8,490,883.

(60) Provisional application No. 61/230,730, filed on Aug. 2, 2009.

(51) Int. Cl.
| | |
|---|---|
| G08B 26/00 | (2006.01) |
| G01V 3/30 | (2006.01) |
| E21B 17/01 | (2006.01) |
| G06K 7/00 | (2006.01) |
| G06K 7/10 | (2006.01) |

(52) U.S. Cl.
CPC .............. *G01V 3/30* (2013.01); *E21B 17/01* (2013.01); *G06K 7/0008* (2013.01); *G06K 7/10316* (2013.01); *G06K 7/10346* (2013.01)

(58) Field of Classification Search
USPC ................... 235/375, 492; 340/505
See application file for complete search history.

(56) References Cited

U.S. PATENT DOCUMENTS

| | | | |
|---|---|---|---|
| 5,202,680 A * | 4/1993 | Savage | 340/853.1 |
| 6,340,932 B1 * | 1/2002 | Rodgers | H01Q 7/00 340/572.7 |
| 2005/0057368 A1 | 3/2005 | Corbett et al. | |
| 2005/0230110 A1 | 10/2005 | Ellison et al. | |
| 2007/0091006 A1 | 4/2007 | Thober et al. | |
| 2008/0105427 A1 | 5/2008 | Hampton et al. | |
| 2009/0153319 A1 | 6/2009 | Duran et al. | |

OTHER PUBLICATIONS

International Search Report for PCT/US2010/044173 dated Nov. 10, 2010.

* cited by examiner

*Primary Examiner* — Daniel Hess
(74) *Attorney, Agent, or Firm* — Chamberlain Hrdlicka

(57) ABSTRACT

A system, in certain embodiments, includes a radio frequency identification (RFID) antenna configured to communicate with an RFID tag. The system also includes an antenna tuner electrically coupled to the RFID antenna, and configured to manually tune the RFID antenna to match an inductance of the RFID tag.

19 Claims, 4 Drawing Sheets

MANUAL RFID ANTENNA TUNING SYSTEM AND METHOD

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations.

To extract the resources from a well, a drilling riser may extend from the well to a rig. For example, in a subsea well, the drilling riser may extend from the seafloor up to a rig on the surface of the sea. A typical drilling riser may include a flanged assembly formed from steel, and the drilling riser may perform multiple functions. In addition to transporting drilling fluid into the well, the riser may provide pipes to allow drilling fluids, mud, and cuttings to flow up from the well.

The riser is typically constructed by securing riser segments together via a flanged connection. Specifically, a first riser segment may be lowered from the rig into the sea. A subsequent riser segment may then be secured to the first segment, before lowering the entire stack. In this manner, a riser of a desired length may be formed. Proper tracking and management of riser segments may extend the useful life of each segment. For example, riser segments positioned at greater depths may experience greater stress than riser segments positioned at shallower depths. Consequently, riser segments may be rotated through various depths to evenly distribute the loads across an inventory of riser segments. Unfortunately, because typical riser segment tracking and management is performed manually, mistakes regarding riser segment deployment may be introduced. Such mistakes may result in decreased riser segment longevity and increased costs.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
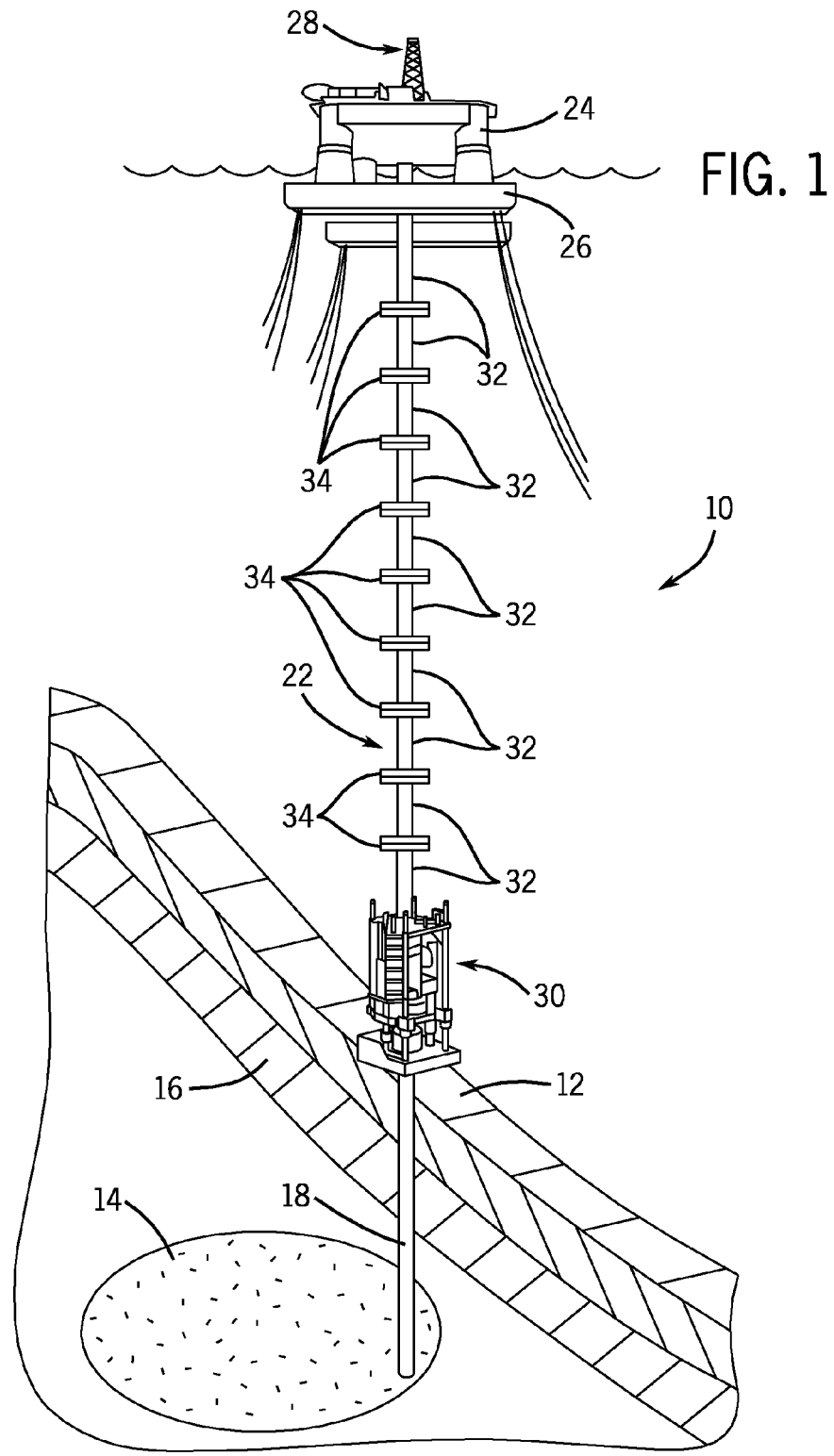
FIG. 1 is a block diagram of a mineral extraction system in accordance with certain embodiments of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure may facilitate automatic tracking and management of oil and gas equipment, such as tubular segments (e.g., riser segments). As discussed below, embodiments of the present disclosure utilize transmitters and receivers to collect data as components (e.g., coaxial tubular components) pass by one another in a mineral extraction system, such as a subsea mineral extraction system having multiple segments leading toward a well. Although the following discussion refers to riser segments, spiders, and gimbals, the disclosed embodiments may be employed with any tubular components that pass by one another in a coaxial or concentric arrangement, or any other suitable mineral extraction equipment.

In certain embodiments, one or more transmitters may be mounted to each riser segment, while one or more corresponding antennas may be mounted to a spider and/or a gimbal of the rig. As each riser segment is lowered through the spider and gimbal, the antennas may automatically receive or discern a signal from the transmitters identifying the riser segment. In this manner, each riser segment is automatically tracked as it is lowered through a drilling spider and/or gimbal. Such a configuration may substantially reduce or eliminate errors inherent in manual riser segment tracking procedures.

As discussed in detail below, in certain embodiments, radio frequency identification (RFID) tags may be coupled to the riser segments, and RFID antennas may be employed to read the tags. Typical RFID antennas are coupled to an automatic antenna tuner configured to adjust an inductance of the antenna to match an inductance of the RFID tag.

Unfortunately, because the environment of a drilling rig includes large moving metallic objects (e.g., riser segments), automatic antenna tuners may be ineffective at tuning the RFID antennas. Specifically, moving metallic objects establish a varying inductance that interferes with the automatic tuning of the antenna. Consequently, the disclosed embodiments may employ a manual RFID antenna tuner which may be unaffected by the varying inductance. In such a configuration, the manual antenna tuner may be tuned to match the inductance of the RFID tags prior to deployment. Once installed, the manual antenna tuner will maintain the desired inductance of the RFID antenna, thereby facilitating proper communication between the RFID antenna and the RFID tag embedded within each riser segment.

FIG. 1 is a block diagram that illustrates an embodiment of a subsea mineral extraction system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead 12 coupled to a mineral deposit 14 via a well 16, wherein the well 16 includes a well-bore 18.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 18 (down-hole). In the illustrated embodiment, the wellhead 12 may include a tubing spool, a casing spool, and a hanger (e.g., a tubing hanger or a casing hanger). The system 10 may include other devices that are coupled to the wellhead 12, such as a blowout preventer (BOP) stack 30 and devices that are used to assemble and control various components of the wellhead 12.

A drilling riser 22 may extend from the BOP stack 30 to a rig 24, such as a platform or floating vessel 26. The rig 24 may be positioned above the well 16. The rig 24 may include the components suitable for operation of the mineral extraction system 10, such as pumps, tanks, power equipment, and any other components. The rig 24 may include a derrick 28 to support the drilling riser 22 during running and retrieval, a tension control mechanism, and any other components.

The wellhead assembly may include a blowout preventer (BOP) 30. The BOP 30 may consist of a variety of valves, fittings and controls to block oil, gas, or other fluid from exiting the well in the event of an unintentional release of pressure or an overpressure condition. These valves, fittings, and controls may also be referred to as a "BOP stack."

The drilling riser may carry drilling fluid (e.g., "mud) from the rig 24 to the well 16, and may carry the drilling fluid ("returns"), cuttings, or any other substance, from the well 16 to the rig 24. The drilling riser 22 may include a main line having a large diameter and one or more auxiliary lines. The main line may be connected centrally over the bore (such as coaxially) of the well 16, and may provide a passage from the rig to the well. The auxiliary lines may include choke lines, kill lines, hydraulic lines, glycol injection, mud return, and/or mud boost lines. For example, some of the auxiliary lines may be coupled to the BOP 30 to provide choke and kill functions to the BOP 30.

The drilling riser 22 may be formed from numerous "joints" or segments 32 of pipe, coupled together via flanges 34, or any other suitable devices. Additionally, the drilling riser 22 may include flotation devices, clamps, or other devices distributed along the length of the drilling riser 22. As the riser 22 is being assembled, a riser segment 32 is secured to a spider by multiple dogs that engage the flange 34. A subsequent riser segment 32 is then bolted to the riser segment 32 within the spider. The riser 22 is then lowered toward the well, and the next segment 32 is secured to the spider. This process facilitates riser construction by building the riser 22 one segment 32 at a time. The spider is supported by a gimbal that enables the spider rotate relative to the platform 26 as the platform moves with the wind and/or waves.

As discussed in detail below, one or more transmitters (e.g., RFID tags) may be mounted to each riser segment 32. One or more corresponding antennas may be mounted to a spider and/or a gimbal of the rig 24. As each riser segment is lowered through the spider and gimbal, the antennas may automatically receive a signal from the transmitters identifying the riser segment. In this manner, each riser segment 32 is automatically tracked as it is lowered toward the wellhead 12. Such a configuration may substantially reduce or eliminate errors inherent in manually riser segment tracking procedures.

As will be appreciated, typical RFID receivers automatically tune the receiving RFID antenna to match an inductance of the RFID tag proximate to the antenna. Unfortunately, because the RFID tags of the present embodiment are embedded within metallic riser segments 32 and surrounded by other metallic components (e.g., the gimbal, the spider, and various other components of the rig 24), an automatic tuner may not be able to tune the RFID antenna before the RFID tag has moved out of range. Specifically, the moving metallic components continuously vary the inductance surrounding the RFID tag. Consequently, an automatic antenna tuner may be ineffective at detecting RFID tags within the environment of a drilling rig 24.

To facilitate reading RFID tags coupled to the metallic riser segments 32, the present embodiment may employ a manual antenna tuner. The manual antenna tuner may include an input device configured to receive settings indicative of an antenna in the spider or gimbal environment and the RFID tag equipped riser joint. The manual antenna tuner may also include circuitry configured to tune the RFID antenna based on the input settings. In this manner, an RFID reader may be able to communicate with RFID tags despite the varying inductance of the metallic environment. As will be appreciated, the present configuration may also be effective for reading RFID tags embedded within other metallic components on the rig 24. Furthermore, manual RFID antenna tuners may be utilized for non-drilling rig applications, such as bridge construction, building construction, or other applications in which RFID tags may be coupled to large metallic structures.

Figure 2:
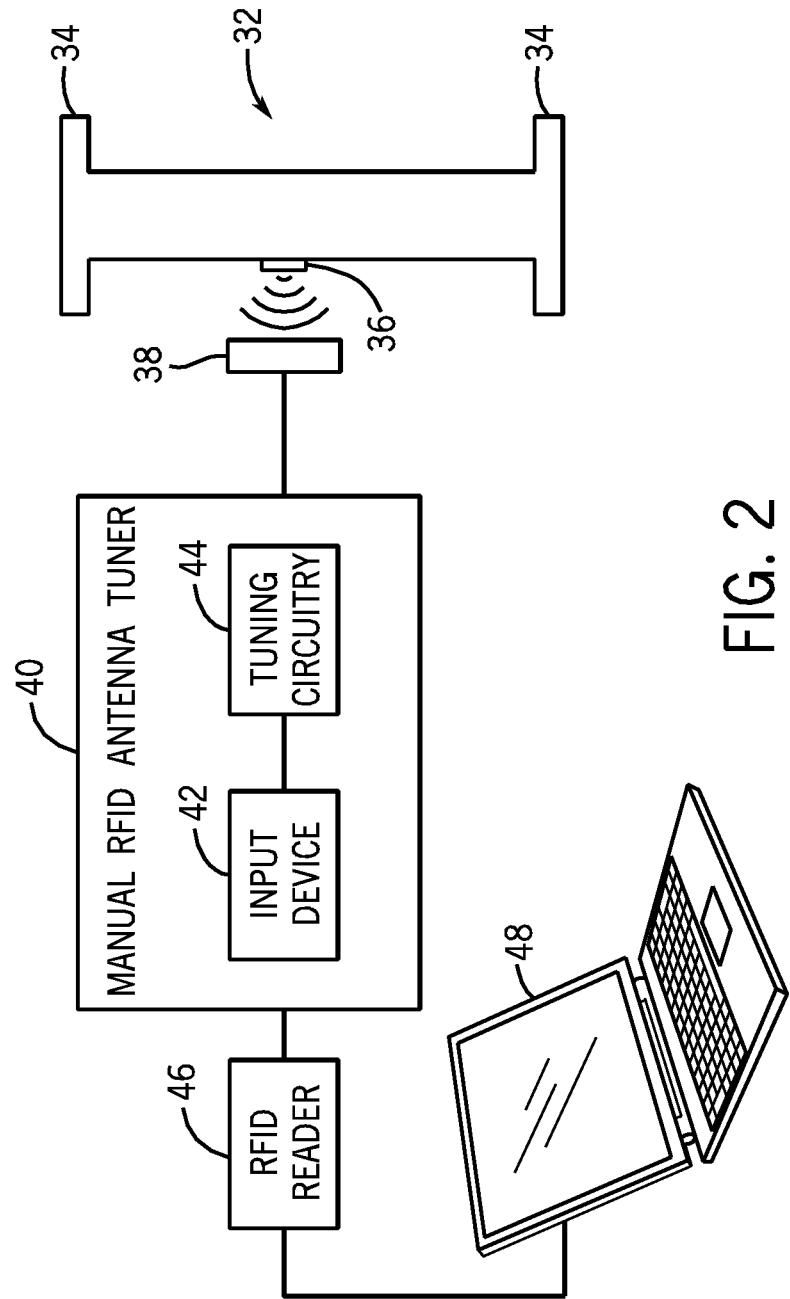
FIG. 2 is a block diagram of a system configured to receive information from a radio frequency identification (RFID) tag embedded within a riser segment in accordance with certain embodiments of the present technique.

FIG. 2 is a block diagram of a system configured to receive information from an RFID tag embedded within a riser segment 32. As illustrated, an RFID tag 36 is coupled to the riser segment 32. An RFID antenna 38 may be disposed within a gimbal or spider of the rig 24, for example. In such a configuration, as each riser segment 32 passes through the gimbal and spider, the RFID antenna 38 may automatically read identification information from the RFID tag 36. In this manner, each riser segment 32 may be tracked as it is deployed, thereby providing accurate tracking and management information. As will be appreciated, the RFID tags 36 may also be coupled to other components within the mineral extraction system 10, such as the BOP 30, components of the derrick 28, etc.

In the present embodiment, each riser segment 32 includes one or more RFID tags 36 configured to communicate with the antenna 38. While RFID tags 36 are referred to below, it will be appreciated that alternative embodiments may employ other transmitter configurations. In one embodiment, two RFID tags 36 are positioned approximately 180 degrees apart about the circumference of the riser segment 32. In further embodiments, more or fewer tags 36 may be positioned along the circumference of the riser segment 32. For example, certain riser segments 32 may include 1, 2, 3, 4, 5, 6, 7, 8, 9, 10, or more tags 36 positioned about the circumference. In certain embodiments, additional RFID tags 36 may be positioned along the longitudinal axis of the riser segment 32. For example, 1, 2, 3, 4, 5, 6, 7, 8, or more sets of circumferentially positioned tags 36 may be positioned along the longitudinal axis of the riser segment 32. In the present configuration, a single RFID tag 36 is disposed to the body of the riser segment 32. Alternative embodiments may include RFID tags 36 disposed within one or both flanges 34 of each riser segment 32.

As will be appreciated, RFID tags 36 include an antenna and a circuit. The antenna is both a receiving antenna and a transmitting antenna, designed to resonate at a particular frequency. Electrical energy is transferred from the antenna 38 to the RFID tag 36 via a power/interrogation signal which is received by the RFID tag antenna and serves to power the circuit. As discussed in detail below, the circuit holds a small amount of coded information, such as identification data. Certain embodiments employ a "passive" circuit which does not have an independent power source and does not initiate transfer of information except in response to the signal from the antenna 38. The power/interrogation signal from the antenna 38 will power the circuit and cause the circuit to generate a control signal encoded with the data stored in the circuit.

In the present configuration, the antenna 38 is electrically coupled to a manual RFID antenna tuner 40. As will be appreciated by those skilled in the art, to transfer energy from the antenna 38 to the RFID tag 36 efficiently, the antenna 38 may be tuned to the resonant frequency of the RFID tag 36. Specifically, the inductance of the antenna 38 may be selected to match the inductance of the RFID tag 36. Therefore, the antenna tuner 40 alters electromagnetic properties of the antenna 38 to properly communicate with the RFID tag 36.

As previously discussed, the large metallic components present within the rig 24 may establish a varying inductance surrounding the RFID tag 36 such that an automatic RFID tuner may be ineffective at tuning the antenna 38 to the resonant frequency of the RFID tag 36. Consequently, the manual RFID antenna turner 40 of the present embodiment includes an input device 42 and tuning circuitry 44 configured to manually adjust the inductance of the antenna 38 to match the inductance of the RFID tag 36. Specifically, the input device 42 includes switches, knobs, or an electronic user interface configured to facilitate input of tuner settings indicative of a desired inductance. As discussed in detail below, an operator may determine the proper inductance of the antenna 38 for effectively communicating with the RFID tag 36. The operator may then input the desired inductance settings into the input device 42. The input device 42 may then adjust the tuning circuitry 44 to match the desired inductance, thereby facilitating an efficient communications link between the antenna 38 and the RFID tag 36.

In certain configurations, the input device 42 provides the only input for adjusting inductance of the antenna 38. In other words, the manual RFID antenna tuner 40 does not automatically sense the inductance of the RFID tag 36 and adjust the antenna inductance to match. In this manner, the manual RFID antenna tuner 40 will not continuously adjust the antenna inductance due to the varying inductance of the environment surrounding the RFID tag 36. Consequently, the antenna 38 may be able to communicate with each RFID tag 36 as the riser segments 32 are deployed.

Thus, the manual RFID antenna tuner 40 enables custom tuning between the RFID tag 36 and the antenna 38 based on the specific context (e.g., metal environment), wherein the custom tuning becomes fixed (rather than allowing variation via automatic tuning) during subsequent deployment and operation. In other words, the manual RFID antenna tuner 40 enables a pre-deployment match between the RFID tag 36 and the antenna 38, which is contrastingly different from an automatic tuner that would not perform any pre-deployment match. Likewise, the manual RFID antenna tuner 40 enables a fixed tuning between the RFID tag 36 and the antenna 38 during operation, which is contrastingly different from an automatic tuner that employs a variable tuning automatically in an attempt to communicate.

As illustrated, the manual RFID antenna tuner 40 is electrically coupled to an RFID reader 46. The RFID reader 46 both provides the power/interrogation signal to the antenna 38, and receives RFID tag information from the antenna 38. For example, in certain configurations, each RFID tag 36 is encoded with a unique identification number. When the RFID tag 36 receives the power/interrogation signal, the tag 36 may transmit a reply signal indicative of the unique identification number. The RFID reader 46 may then convert this signal into a digital representation of the unique identification number for the particular RFID tag 36. As discussed in detail below, the tag identification number may serve to uniquely identify a particular riser segment 32.

As illustrated, the RFID reader 46 is communicatively coupled to a data processing unit, such as the illustrated computer 48. The computer 48 is configured to receive tag identification data from the RFID tag 36 to uniquely identify a particular riser 32.

As previously discussed, each RFID tag 36 contains a circuit which stores a unique identification number. For example, in the present embodiment, each RFID tag 36 includes a 64 bit identification number. As will be appreciated, more than $18 \times 10^{18}$ possible identification numbers exist within a set of 64 bit numbers. Therefore, there is effectively no limit to the number of RFID tags 36 that may be employed in the present configuration. In alternative embodiments, 16 bit, 32 bit, 128 bit, or more, identification numbers may be utilized. The computer 48 may include a table that associates the tag identification number with a particular riser segment 32. As will be appreciated, every riser segment 32 (or other component including an RFID tag 36) within an inventory may be included within the table.

In the present embodiment, the antenna 38 is configured to communicate with low frequency RFID tags 36. As will be appreciated, RFID tags 36 may transmit within a variety of frequency ranges. For example, RFID tags 36 that operate within a frequency range of approximately between 30 to 300 kHz are generally considered low frequency, RFID tags 36 that operate within a frequency range of approximately between 3 to 30 MHz are generally considered high frequency, and RFID tags 36 that operate within a frequency range of approximately between 0.3 to 3 GHz are generally considered ultra high frequency.

Each operating frequency has particular advantages and disadvantages. Specifically, low frequency RFID tags (i.e., tags operating at a frequency approximately between 30 to 300 kHz) have the ability to transmit through materials that would block high frequency and/or ultra high frequency transmissions. In the present application, an RFID tag 36 may be secured to the riser segment 32 prior to priming and painting the segment 32. Therefore, the RFID tag 36 may be coated with one or more layers of primer and paint. Such coatings may interfere within high frequency and/or ultra high frequency transmissions. Furthermore, the riser segments 32 are exposed to various contaminants on the rig 24. For example, drilling mud, grease, or other material may build up on the riser segments 32 and the RFID tags 36. Such materials may further interfere with high frequency and/or ultra high frequency transmissions. Consequently, the present embodiment may employ low frequency RFID tags 36 which emit a signal that may penetrate the primer, paint, drilling mud, grease, or other materials. For example, the present embodiment may employ RFID tags 36 that operate within a frequency range of approximately between 30 to 300, 50 to 250, 75 to 200, 100 to 150, or about 125 kHz. Such frequency ranges may be particularly suited for the drilling environment.

Figure 3:
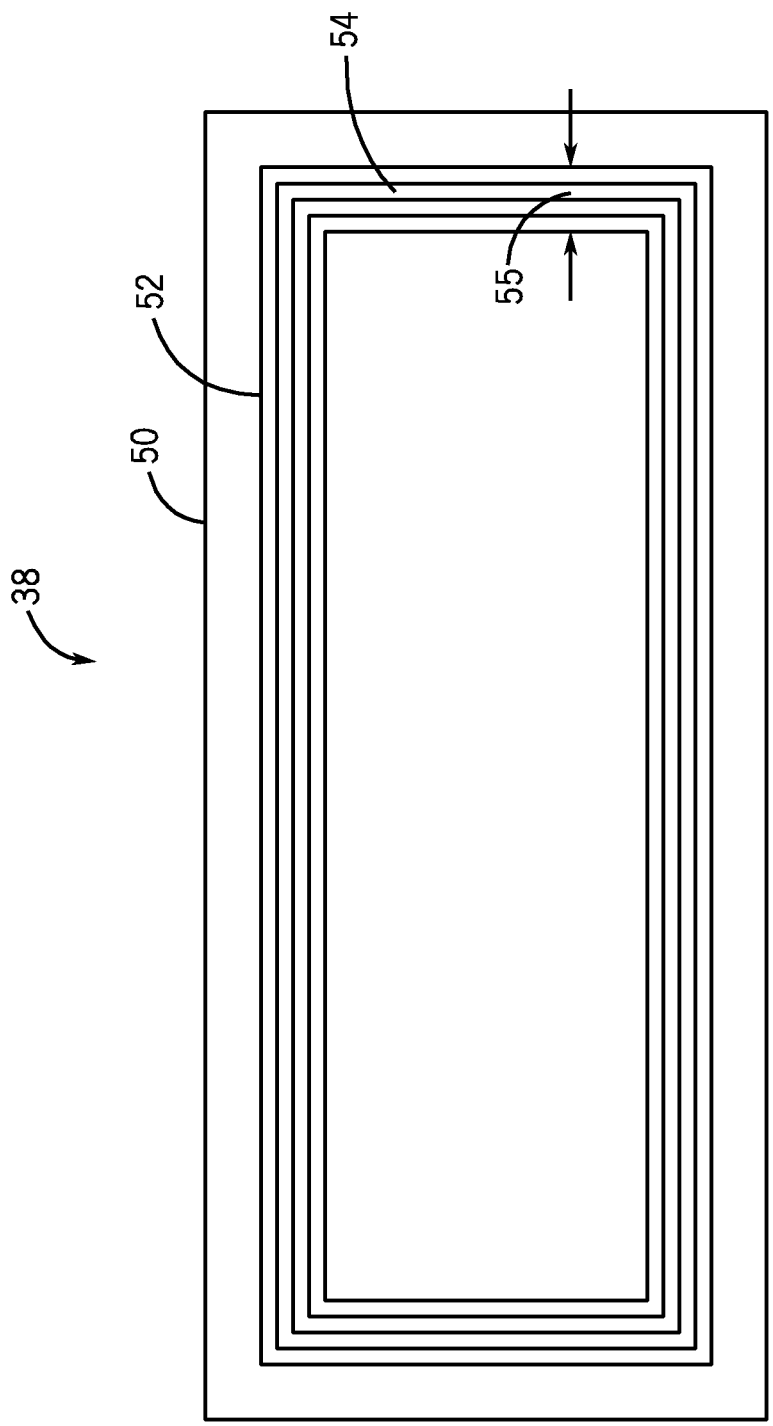
FIG. 3 is a front view of an antenna that may be employed within the system of FIG. 2 in accordance with certain embodiments of the present technique.

FIG. 3 is a front view of an antenna 38 that may be employed within the system of FIG. 2. As illustrated, the antenna 38 includes a flat plate 50 including a recess 52 disposed about a perimeter of the plate 50. As discussed in detail below, a coil of conductive wire 54 is disposed within the recess 52, and configured to receive a signal from the RFID tag 36. The plate 50 may be constructed from a variety of suitable materials. The particular material may be selected such that the plate 50 does not interfere with the signal from the RFID tag 36. For example, the plate 50 may be molded from a thermoplastic, such as ABS, acrylic, PEEK, polyester, or other suitable thermoplastic. In one embodiment, the plate 50 is molded from an acrylic-polyvinyl chloride thermoplastic. This particular material may be well suited for use in the drilling environment because of its chemical resistance properties.

As illustrated, a width 55 of the recess 52 may be selected to accommodate a coil of conductive wire 54 which serves as the receiving and/or transmitting element of the antenna 38. The conductive wire 54 may be composed of any suitable material, such as copper, for example. Furthermore, the thickness of the wire 54 may be particularly selected to enhance a read range of the antenna 38. As illustrated, the conductive wire 54 extends along the recess 52 to establish three turns, i.e., three complete revolutions about the perimeter. As will be appreciated, the number of turns may be selected based on the inductance of the RFID tag 36 and the antenna 38 mounted in the largely metallic environment. As discussed in detail below, when selecting the number of turns for the conductive wire 54, an RFID tag 36 may be placed within the read range of the antenna 38. The number of turns may then be adjusted to match the inductance of the RFID tag 36 and the antenna 38. In this manner, the antenna 38 may be coarsely "tuned" to match the particular RFID tags 36 employed in a particular application.

Once the proper number of turns of the conductive wire 54 has been established, the conductive wire 54 may be secured within the recess 52 of the antenna 38. For example, an adhesive may be employed to couple the wire 54 to the recess 52 of the plate 50. In certain embodiments, the conductive wire 54 may be first placed within the recess 52. A liquid resin (e.g., polyester, vinylester, epoxy, etc.) may then be poured into the recess 52 over the conductive wire 54. When the resin hardens, the wire 54 will be permanently secured within the recess 52 of the antenna 38. The completed antenna 38 may then be secured to the gimbal or spider to read RFID tags 36 coupled to the riser segments 32.

Figure 4:
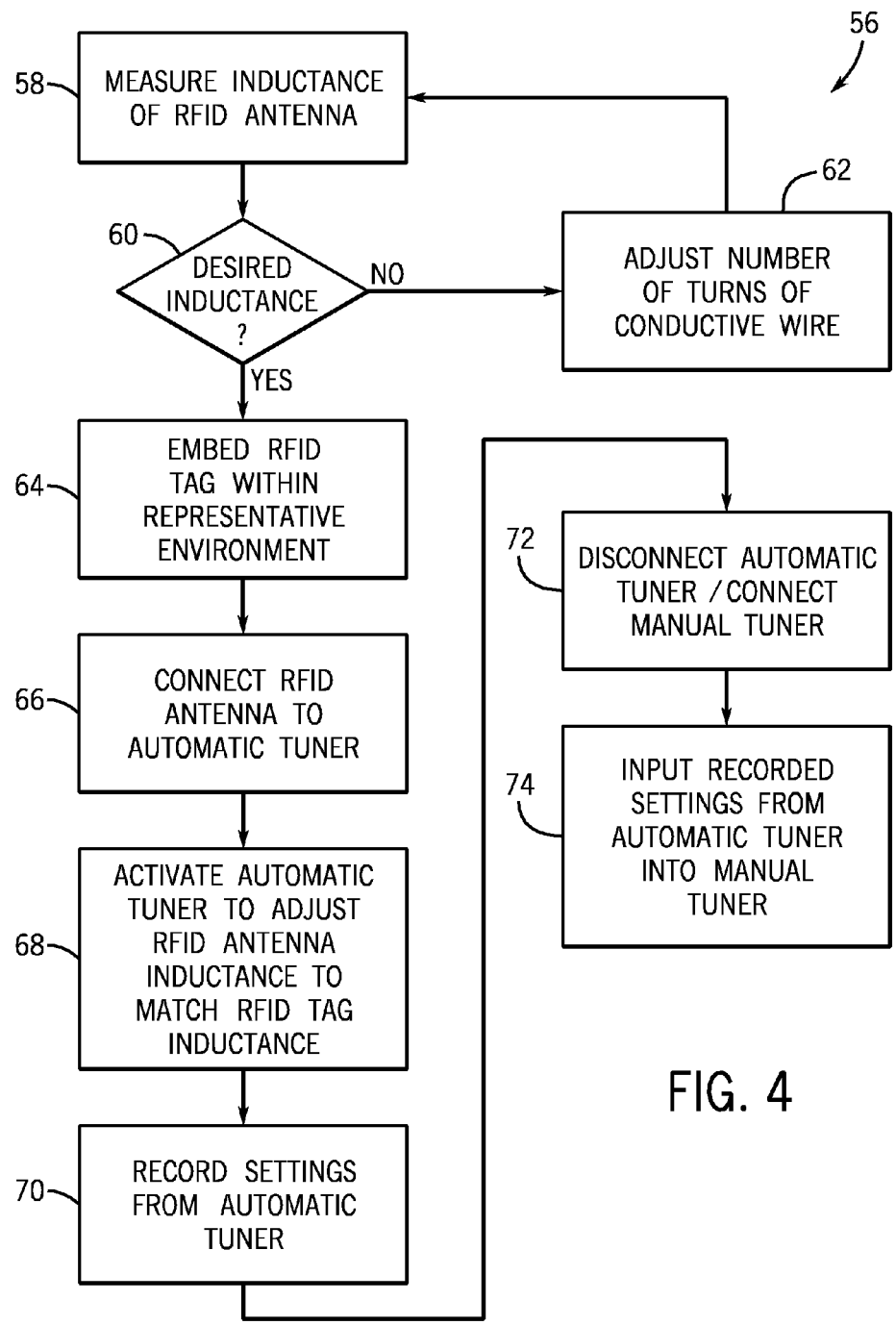
FIG. 4 is a flow diagram of an exemplary method for manually tuning an RFID antenna in accordance with certain embodiments of the present technique.

FIG. 4 is a flow diagram of a method 56 for manually tuning an RFID antenna 38. The RFID antenna 38 may be tuned prior to installing the antenna 38 in an operational environment. In other words, the tuning method 56 described below is part of the initial configuration process. Once the antenna 38 has been properly tuned and deployed, further tuning operations may not be needed. Consequently, the antenna 38 may effectively operate to read RFID tags 36 associated with riser segments 32 or other components on the rig 24.

First, as represented by block 58, the inductance of the RFID antenna 38 is measured. As will be appreciated, typical inductance meters only measure inductance below 1 kHz. However, as previously discussed, the antenna 38 may operate at approximately 125 kHz. Consequently, a unique method may be employed to measure the inductance of the antenna 38 at 125 kHz, for example. First, a series of coarse, medium and fine tuning high power potentiometers are installed in series with the antenna 38. This series circuit (i.e., antenna 38 and potentiometers) is then connected to a function generator configured to simulate a 125 kHz sinusoidal signal. An oscilloscope may then be utilized to measure an RMS voltage across the antenna 38 and the set of potentiometers. The potentiometers are then adjusted until a voltage across the potentiometers is equal to a voltage across the antenna 38. The resistance across the bank of potentiometers is then measured and recorded. As will be appreciated, because the voltage across the potentiometers is equal to the voltage across the antenna 38, the resistance across the bank of potentiometers is equal to the impedance of the antenna 38. As will be further appreciated, inductance may be computed based on the calculated impedance and the operating frequency of the antenna 38 (e.g., 125 kHz). In this manner, the inductance of the antenna 38 may be accurately measured.

Next, as represented by block 60, the measured inductance is compared to a desired inductance. The desire inductance is the approximate value of the inductance of the RFID tag 36. If the inductance does not match the desired inductance, a number of turns of the conductive wire 54 is adjusted, as represented by block 62. For example, if the inductance of the antenna 38 is greater than the desired inductance, the number of turns of the conductive wire 54 may be reduced. As will be appreciated, tuning of the antenna 38 is performed before the conductive wire 54 is secured within the recess 52. Specifically, once the proper number of turns has been selected, the conductive wire 54 may be adhesively coupled to the antenna 38, as previously described.

Once the antenna 38 has been coarsely tuned, and/or during the tuning process, an RFID tag 36 is embedded within an environment representative of the environment in which the RFID tag 36 will operate, as represented by block 64. For example, in the present configuration, the RFID tag 36 may be affixed to a riser segment 32. Therefore, a representative environment may involve embedding the RFID tag 36 within a metal block having similar inductive properties to the riser segment 32. As will be appreciated, the better the representative environment matches the operational environment, the more effective the tuning process.

Next, as represented by block 66, the RFID antenna 38 is connected to an automatic RFID antenna tuner. As previously discussed, automatic antenna tuners may be ineffective in an operational environment because they continuously adjust the inductance of the antenna 38 as the inductance of the environment changes. In contrast, because the representative environment is stationary, the automatic antenna tuner may be employed to effectively determine the inductance of the RFID tag 36 within the representative environment. Specifically, the automatic RFID antenna tuner is activated to adjust the inductance of the RFID antenna 38 to match the inductance of the RFID tag 36, as represented by block 68.

As will be appreciated, the automatic antenna tuner may be configured to output settings indicative of the inductance of the detected RFID tag 36. These settings may be recorded, either manually or electronically, as represented by block 70. The automatic antenna tuner may then be disconnected from the antenna 38, and the manual RFID antenna tuner 40 may be connected, as represented by block 72. Finally, the recorded settings output from the automatic antenna tuner may be input into the manual antenna tuner 40, as represented by block 74. In this manner, the antenna 38 may be properly tuned for both the particular RFID tag 36 and the environment in which the tag 36 is employed. As previously discussed, because the manual RFID antenna tuner 40 does not continuously adjust antenna inductance based on the changing environment, the RFID reader 46 may be able to effectively read each RFID tag 36 associated with each riser segment 32 as the riser segments 32 pass through the gimbal and spider.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system for use with a mineral extraction system for a well, including:
   a tubular string including multiple tube segments, each tube segment including a radio frequency identification (RFID) tag;
   an RFID antenna configured to communicate with the RFID tag; and
   an antenna tuner electrically coupled to the RFID antenna and configured to manually tune the RFID antenna to match the inductance of the RFID tag.

2. The system of claim 1, wherein each tube segment includes multiple RFID tags.

3. The system of claim 2, wherein the tubular string includes a riser and the tube segments include riser segments, each including flanges and each flange including an RFID tag.

4. The system of claim 3, wherein each riser segment flange includes multiple RFID tags.

5. The system of claim 3, further including an RFID reader electrically coupled to the antenna tuner and wherein the RFID reader provides power and an interrogation signal to the RFID antenna.

6. The system of claim 5, further including a data processing unit communicatively coupled to the RFID reader, wherein the data processing unit is configured to receive RFID tag identification information from the RFID reader.

7. The system of claim 1, wherein the RFID tag includes more than one inductance and the antenna tuner is configured to manually tune the RFID antenna to match one of the inductances of the RFID tag.

8. The system of claim 1, wherein the antenna tuner includes an input device configured to receive settings indicative of the RFID antenna and the RFID tag.

9. The system of claim 8, wherein the antenna tuner further includes tuning circuitry configured to tune the RFID antenna based on the input settings.

10. The system of claim 1, further including more than one RFID antenna.

11. A system for use with a mineral extraction system for a well, comprising:
    a tubular string including multiple tube segments, each tube segment including a radio frequency identification (RFID) tag; an RFID antenna configured to communicate with the RFID tag; and an antenna tuner electrically coupled to the RFID antenna and configured to tune the RFID antenna to a fixed inductance to match the inductance of the RFID tag, wherein the antenna tuner is a manual tuner.

12. The system of claim 11, wherein the tubular string includes a riser and the tube segments include riser segments, each including flanges and each flange including an RFID tag.

13. The system of claim 12, wherein each riser segment flange includes multiple RFID tags.

14. The system of claim 11, further including: an RFID reader electrically coupled to the antenna tuner; and a data processing unit communicatively coupled to the RFID reader, wherein the data processing unit is configured to receive RFID tag identification information from the RFID reader.

15. A method of communicating with an RFID tag in an operating environment in which the RFID tag operates, including: measuring the inductance of an RFID tag;
    adjusting the inductance of an RFID antenna to match the inductance of the RFID tag;
    determining the inductance of the RFID tag in an environment representative of the operating environment;
    manually tuning the RFID antenna to a fixed inductance to match the inductance of the RFID tag in the representative environment;
    communicating with the RFID tag in the operating environment with the RFID antenna.

16. The method of claim 15, wherein adjusting the inductance of the RFID antenna includes varying a number of turns of a conductive wire within the RFID antenna.

17. The method of claim 15, further including: wherein determining the inductance of the RFID tag in the representative environment includes connecting the RFID antenna to a manual RFID antenna tuner.

18. The method of claim 15 wherein tuning the RFID antenna to a fixed inductance includes:
    connecting the RFID antenna to an automatic RFID antenna tuner;
    outputting settings with the automatic RFID antenna tuner indicative of the inductance of the RFID tag;
    disconnecting the automatic RFID antenna tuner from the RFID antenna;
    connecting a non-automatic RFID tuner to the RFID antenna; and
    tuning the RFID antenna with the non-automatic RFID tuner based on the settings output from the automatic RFID antenna tuner.

19. The method of claim 18, wherein settings for non-automatic RFID tuner are input manually.

* * * * *